United States Patent [19]
Chadha

[11] 3,956,153
[45] May 11, 1976

[54] REGENERATIVE NUCLEATING AGENTS
[75] Inventor: Desh D. Chadha, Parsippany, N.J.
[73] Assignee: Bio-Medical Sciences, Inc., Fairfield, N.J.
[22] Filed: Sept. 26, 1973
[21] Appl. No.: 401,040

[52] U.S. Cl.................................. 252/67; 73/356; 116/114.5; 252/78; 252/408; 260/707
[51] Int. Cl.²....................... C09K 5/00; C09K 3/00
[58] Field of Search.................. 252/67, 68, 70, 71, 252/73, 408; 73/356, 358; 116/114.5

[56] References Cited
UNITED STATES PATENTS

| | | | |
|---|---|---|---|
| 3,175,401 | 3/1965 | Geldmacher | 73/358 |
| 3,704,985 | 12/1972 | Pickett et al. | 73/356 |
| 3,765,243 | 10/1973 | Pickett et al. | 73/356 |

Primary Examiner—Leland A. Sebastian
Assistant Examiner—Josephine Lloyd
Attorney, Agent, or Firm—Anthony Lagani, Jr.

[57] ABSTRACT

The phenomena of undercooling encountered with various heat responsive materials in passing from the liquid to solid phase is minimized by incorporation of a regenerative nucleating agent which is soluble to some degree in the heat responsive materials.

7 Claims, No Drawings

REGENERATIVE NUCLEATING AGENTS

A present invention pertains to a method of minimizing the phenomenon of undercooling in the liquid-solid phase transformation of thermally responsive materials and to novel compositions demonstrating such properties.

A variety of industrial products and processes utilize transformation of various materials from liquid to solid phase or solid to liquid phase. For example, molten masses have been employed to achieve heat storage. The reversible absorption of heat in passing from a solid phase into a liquid phase or into another solid phase is employed, for example, in accummulators or reservoirs in refrigerated containers or vehicles. Phase transformations are utilized in a number of temperature measuring devices, the devices being designed so that a phase transformation occurs at a given and preselected temperature so as to indicate the attainment of at least that temperature. Hair curlers and solar heating devices also utilize the enthalpy of two different phases.

In all of these applications, the phenomenon of undercooling in the passage of the thermally responsive material from the liquid phase to the solid phase is encountered. Thus it is known that while such thermally responsive materials may present a distinct melting point in passing from the solid phase to the liquid phase solidification of the liquid phase through the removal of heat often occurs at a temperature below the melting point. This phenomenon, which is known as undercooling, is particularly evident in the case of extremely pure materials. It is desirable for a number of reasons that the temperature of solidification be as close to the melting point as possible and that the phenomenon of undercooling be minimized.

There is described in Austrian patent application No. A5,389/68 filed June 6, 1968, Austrian patent application Nos. A1,068/69 and A1,062/69 filed Jan. 3, 1969 and French Pat. No. 2,010,241, a means of minimizing undercooling by providing crystal seeds within the heat responsive material. These are generally of a fibrous crystal structure and are typified by such materials as silicates, aluminates, light metal ferrites, oxides and alike. Similarly co-pending application Ser. No. 295,235 filed Oct. 5, 1972 describes the use of nucleating agents which accelerate the rate of resolidification of thermally responsive materials employed in temperature measuring devices.

In all of these prior art devices, the nucleating substance is a material which has a similar crystal structure to the heat responsive material. Moreover, since it is generally desirable that the melting point of the thermally responsive material is not depressed, the nucleating agent will also be a substance which is insoluble in the particular material. This latter criterion, however, also results in stability problems in that the insoluble nucleating agent tends to separate or precipitate from the thermally responsive material. Repeated cycling through the phase transformation can also result in time in a loss of nucleating activity, possible as a consequence of changes in the surface of the nucleating agent.

To overcome these problems, it has been proposed to deposit the nucleating agent on an inert carrier. It has also been suggested to provide a mount or support for the nucleating agent with the crystal seeds remaining uniformly disposed inside the mount after solidification of the thermally responsive material.

The present invention utilizing a totally different type of nucleating substance. While the nucleating substance of the present invention share with the prior art nucleating substances the characteristic of having a crystal structure similar to the thermally responsive material, that is at least one a/b, a/c or c/b unit cell ratio and a space group substantially identical with the heat responsive material, the present invention represents a distinct departure from the prior art approach in that the nucleating substance is intentionally soluble, in the heat responsive material and increasingly so at temperatures above the temperature at which the phase transformation occurs. Moreover, the nucleating substance will have a melting point significantly higher than the temperature at which the phase transformation occurs. The magnitude of the difference between the melting point of the heat responsive material and the nucleating substance can vary widely, depending primarily upon the temperatures to which the heat responsive material will normally be subjected, it being desirable that the nucleating substance melts above such 'normally encountered temperatures'.

In operation, a nucleating substance satisfying the above criteria performs as follows. An amount of the nucleating agent in excess of that which will dissolve in the thermally responsive material at the phase transformation temperature is added to the thermally responsive material, the latter being in the liquid phase. The amount of excess is not critical and indeed it is generally desirable to add only small excess. The absolute percent composition will of course depend upon the particular heat responsive material and nucleating substance, primarily the solubility of the latter in the former, but generally there will be from about 0.1 to about 50 percent by weight of the nucleating substance in the thermally responsive material.

In view of the fact that the nucleating substance is only sparingly soluble in the heat responsive material, it has little effect on depressing the melting point of the material. Any small amount of melting point depression which occurs is readily calculated and easily nullifed through adjustment of the composition of the thermally responsive material or the selection of other chemicals.

In the course of transformation of the material from solid to liquid phase, the nucleating substance remains sparingly soluble. Further elevations in temperature however results in an increasing amount of the nucleating substance being dissolved in the thermally responsive material and this continues as the temperature increases. Indeed, it is completely feasible to utilize such an amount of nucleating substance that all of it becomes dissolved in the thermally responsive material at some normally encountered temperature lying above the phase transformation temperatures and below the melting point of the nucleating substance. Since however this may result in a supersaturated solution, it is preferable to utilize in excess of the amount which will dissolve at the normally encountered temperatures.

In the course of resolidification as the temperature of the thermally responsive material falls from the normally encountered temperatures above the phase transformation temperature to the phase transformation temperature, the dissolved nucleating substance is thrown out of solution as the solubility decreases with decreasing temperature. Consequently, solid nucleating substance is regenerated and thus is present as the thermally responsive material in the liquid phase approaches the phase transformation temperature. This solid nucleating substance thus serves as a site for crystal growth and minimizes the undesirable undercooling heretofore encountered.

Since the nucleating substance is in a dynamic relationship with the thermally responsive material, and not merely physically dispersed therein, the above cycle can be repeated indefinitely without any change in the performance characteristics designed into the system.

It is to be appreciated that this invention may be utilized with any material which undergoes repeated and/or cyclic liquid-solid phase transformation. This is true whether the temperatures involved are low, e.g., 0° to 200°F or considerably above this range. The particular materials selected will of course depend on the particular application involved and the temperature to be encountered, it being understood that the above criteria are employed in selecting the materials once these operating parameters are known.

By way of example, there is described in Belgium Pat. No. 770,290 a device employed in temperature measurements. A critical component of this device is a thermally responsive material which is a solid solution of at least two components. Typical of these are o-chloronitrobenzene: o-bromonitrobenzene; 1-menthol: dl-menthol; acetophenone: benzophenone; dimethylsuccinate: dimethyl oxalate; 4-chloropropiophenone: 4-bromopropiophenone; 4-chloro-2-methylaniline: 4-bromo-2-methylaniline; 4-chloroacetophenone: 4-bromoacetophenone; n-butylsulfoxide: n-butylsulfone; n-hexane: 2-nonodecane; cyclohexane: 2-nonodecane; and alpha-chlorocinnamaldehyde: alpha-bromocinnamaldehyde. These components are mixed in varying amounts so that the melting points of the different mixtures are a function of the relative concentration. Because of the need for great accuracy and precision, these materials are in a very high state of purity. Consequently, the phenomenon of undercooling is observed. Thus, if one of these solid solutions designed to have a melting point ($T_m$) of, for example, 96°F. is subjected to a higher temperature, the material will undergo a phase transformation from solid to liquid. Upon cooling of this liquid phase, resolidification will occur at a temperature ($T_s$) which is below $T_m$. The difference in these two temperatures ($T_m - T_s$) is the "undercooling".

One problem which is encountered with such devices as a result of undercooling, is the exposure of these thermally responsive materials to temperatures in excess of those to be encountered in actual use. Thus for example, if the device is designed to measure human body temperature, exposure of the device to a temperature of, for example, 110°F during travel will result in a solid to liquid phase transformation. With proper precautions, such a premature phase transformation is not necessarily detrimental, provided the liquid material is transformed back into a solid phase prior to use. This transformation however may require several hours even at temperatures below the normal melting point of the particular mixture, since the materials are of very high purity. Consequently it is desirable to minimize this undercooling so that the device can be employed shortly after exposure to the elevated temperature.

Utilization of the nucleating substances of the present invention result in a minimization of this undercooling phenomenon. Thus, while the thermally responsive solid solution containing the nucleating substance will resolidify at a temperature ($T_{s'}$) below ($T_m$), the difference ($T_m - T_{s'}$) is less than ($T_m - T_s$).

Utilizing the parameters set forth above, one can select a suitable regenerative nucleating substance for a particular application. Thus it can determine from published physical data that a substance as anthraquinone has a melting point higher than the temperatures at which the phase transformation occurs. Moreover, it can readily be ascertained through simple solubility tests that anthraquinone is soluble but only sparingly so in the solid solutions referred to above at their phase transformation temperatures. A chemist of ordinary skill can of course predict that anthraquinone will be chemically inert to these solid solutions and this prediction can be readily confirmed through simple laboratory tests.

The amount of the excess of the nucleating substance which is added is not critical and is usually dictated solely by economic consideration.

It is to be appreciated that the use of the term nucleating agent does not imply any change in the structure of the solid solutions involved. Thus there is no change in the crystallinity of the solid solution by incorporation of these nucleating agents. This is significant since a number of related substances as for example indigotin, anthraquinone and 2-methylbenzimidazole have been used to increase the crystallinity of hindered polymers such as poly (2,6-dimethyl) phenylene oxide which would otherwise not crystallize. See, e.g., Polymer letters, 9 435 (1971).

It is to be appreciated that the foregoing description describes a general method which can be used with numerous thermally responsive materials and that the foregoing discussion of the use of anthraquinone is merely a typical embodiment of the present invention.

The following examples will serve to further typify the present invention but should not be construed as a limitation on the scope thereof, the scope being defined solely by the appended claims.

EXAMPLE 1

A series of solid solutions of o-bromonitrobenzene and o-chloronitrobenzene having weight percent composition ratios ranging from 56.2:43.8 to 96.0:4.0 respectively were prepared as described in belgium Pat. No. 770,290. These demonstrated graduated melting points ranging from 96.0°F. (37.54°C) to 104.8°F (40.44°C). Such solutions containing no other components demonstrate an undercooling ($\Delta T_{uc} = T_m - T_s$) of about 34°F., i.e., the temperature of resolidification of the liquid phase is approximately 34°F. below the temperature at which the solid phase melts. Thus the liquid phase must be cooled to approximately 62°–63°F. in order to achieve resolidification.

These solid solutions are heated to 140°F. and saturated with anthraquinone which was previously purified by recrystallization from toluene. The saturated solutions are then cooled and demonstrate a $\Delta T_{uc}$ of only 11°F.; i.e., it instantly resolidifies at temperatures of from 82° to 83°F.

EXAMPLE 2

A series of tests were conducted to determine the time required for recrystallization of a solid solution of 56.2% o-bromonitrobenzene and 43.8% o-chloronitrobenzene containing a nucleating substance upon being subjected to room temperature (73°F.) after storage at elevated temperatures. The nucleating substance is anthraquinone as set forth in Example 1.

sulfoxide:n-butylsulfone; n-hexane:2-nonodecane; cyclohexane:2-nonodecane; and alpha-chlorocinnamal-

| Sample No. | Saturation Temperature | Temp. | Aging Conditions Rel. Humidity | Time | Time to resolid at 73°F. |
|---|---|---|---|---|---|
| 1 | 130°F. | 120°F. | ambient | 30 days | <5 min. |
| 2 | 140°F | 120°F. | 50% | 21 days | <5 min. |
| 3 | 125°F. | 120°F. | 0% | 16 days | <5 min. |
| 4 | 125°F. | 120°F. | ambient | 16 days | <5 min. |
| 5 | 125°F. | 120°F. | 50% | 16 days | <5 min. |

A sixth sample saturated at 125°C was repeatedly heated to 120°F. and cooled to 73°F. at ambient humidity for 50 cycles. The sample continued to require less than 5 minutes to resolidify upon being subjected to the lower temperature.

Samples in actual thermometers in all cases achieved resolidification within 15 minutes of being subjected to room temperatures (70°–73°F.). Only in the case of aging the materials at temperatures above the temperature of saturation was slower resolidification observed, presumably because all the anthraquinone was then dissolved and a supersaturated solution was obtained upon cooling.

What is claimed is:

1. In a material which is thermally responsive to a reversible change in phase from liquid to solid the method of minimizing undercooling in the course of transformation of said material from the liquid to solid phase which comprises incorporating in said material a chemically inert nucleating substance which is soluble but sparingly so in said thermally responsive material at said phase transformation temperature, said substance having at least one a/b, a/c, or c/b unit cell ratio and a space group substantially identical with said material but a melting point significantly higher than the temperature at which said phase transformation occurs, the amount of said substance being incorporated being in excess of the amount which will dissolve in said material at both said phase transformation temperature and at a higher preselected, normally encountered temperature and being about 0.1 to about 50 percent by weight of said material.

2. The method of claim 1 wherein said thermally responsive material is a solid solution selected from the group consisting of o-chloronitrobenzene:o-bromonitrobenzene; 1-methol:dl-menthol; acetophenone:benzophenone; dimethylsuccinate:dimethyl oxalate; 4-chloropropiophenone: 4-bromopropiophenone: 4-chloro-2-methylaniline: 4-bromo-2-methylaniline; 4-chloroacetophenone: 4-bromoacetophenone; n-butylsulfoxide:n-butylsulfone; n-hexane:2-nonodecane; cyclohexane:2-nonodecane; and alpha-chlorocinnamaldehyde:alpha-bromocinnamaldehyde, and said nucleating substance is anthraquinone.

3. The method of claim 2 wherein said thermally responsive material is a solid solution of o-chloronitrobenzene and o-bromonitrobenzene.

4. A composition of matter comprising: (a) a thermally responsive material wherein said thermally responsive material is a solid solution selected from the group consisting of o-chloronitrobenzene: o-bromonitrobenzene; 1-menthol: dl-menthol; acetophenone: benzophenone; dimethyl-succinate: dimethyloxalate; 4-chloropropiophenole:4-bromopropiophenone; 4-chloro-2-methylaniline: 4-bromo-2-methylaniline: 4-chloroacetophenone: 4-bromoacetophenone: n-butylsulfoxide: n-butylsulfone; n-hexane; 2 nondecane; and alpha-bromocinnamaldehyde, alpha-chlorocinnamaldehyde: and (b) a chemically inert nucleating substance which is soluble but sparingly so in said thermally responsive material at said phase transformation temperature, said substance having at least one a/b, a/c, or c/b unit cell ratio and a space group substantially identical with said material but a melting point significantly higher than the temperature at which said phase transformation occurs, the amount of said substance being incorporated being in excess of the amount which will dissolve in said material at both said phase transformation temperature and at a higher preselected, normally encountered temperature and being about 0.1 to about 50 percent by weight of said material.

5. A composition of matter according to claim 4 where said thermally responsive material is a solid solution of o-chloronitrobenzene and o-bromonitrobenzene.

6. The method of claim 3 wherein the nucleating substance is anthraquinone.

7. The composition of claim 4 wherein the nucleating substance is anthraquinone.

* * * * *